C. W. NICHOLS.
Safety-Straps for Harness.

No. 145,006. Patented Nov. 25, 1873.

Witnesses:
O. Bradford Steele
George E. Upham

Inventor.
Clarence W. Nichols,
Chipman Cosmer & Co,
Attys

UNITED STATES PATENT OFFICE.

CLARENCE W. NICHOLS, OF CHICAGO, ILLINOIS, ASSIGNOR TO HENRY H. FRARY, OF SAME PLACE.

IMPROVEMENT IN SAFETY-STRAPS FOR HARNESS.

Specification forming part of Letters Patent No. 145,006, dated November 25, 1873; application filed September 10, 1873.

*To all whom it may concern:*

Be it known that I, CLARENCE W. NICHOLS, of Chicago, in the county of Cook and State of Illinois, have invented an Improved Safety-Strap for Harness, of which the following is a specification:

This invention is designed for preventing the lines, check-rein, martingale and its rings, or any other portion of the harness, from becoming entangled with the forward ends of the thills; also, for preventing the lines dropping down so as to become entangled with the animal's feet; also, for preventing the forward ends of the thills from entangling with stationary or moving objects, or perforating a blanket or net which may be placed on the animal; also, for enabling the animal to stop the vehicle quickly, and thereby avoid colliding with passing or stationary objects; also, for preventing the animal's passing out from the thills, should the tugs unhitch or the whiffletree part, and also for rendering unnecessary the use of breeching, and thereby allowing the animal to have free use of his limbs.

Figure 1:
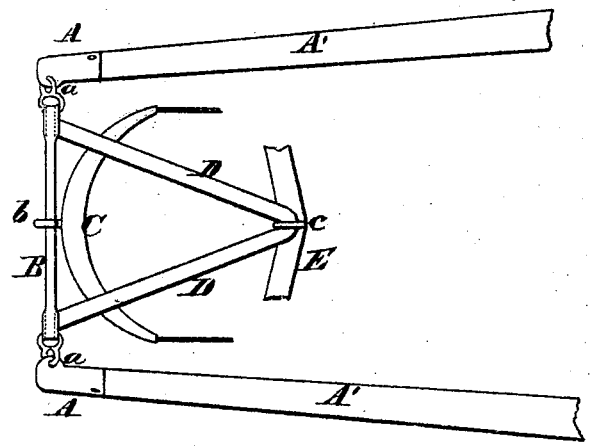
Figure 2:
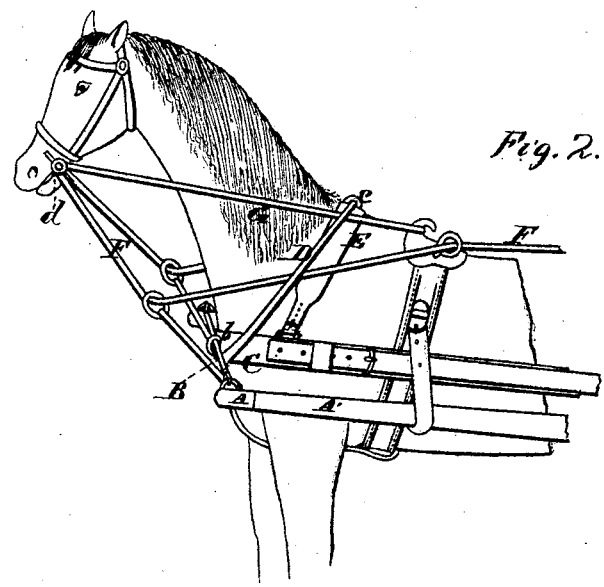

The following is a description of my improvements:

In the accompanying drawings, A A represent metal caps, which are permanently secured to the front ends of the thills A' A', and constructed with eyes $a$ $a$ on their inner sides. B represents a strap or bar, which is connected to the eyes $a$ $a$ by means of snap-hooks, or in any other suitable manner, and which passes through an eye or ring, $b$, secured to the front central part of the breast-collar C, as shown clearly in Fig. 1. D represents a strap, which is connected, by means of snaps, to the eyes $a$ $a$ on caps A A, or which may be stitched to the cross-strap B. This strap D is carried over the neck of the animal and passed freely through a ring or eye, $c$, which is fixed permanently to the neck-strap E, so as to play freely with the thills in their lateral motion.

It will be observed that the two straps B and D form a triangle, the base strap of which connects together the front ends of the thills, and is itself connected to a ring on the breast-strap; and the strap which forms the other two sides of the triangle affords a safe support for the thills upon the horse's neck, at the point where the neck-strap E crosses it.

The lines F and check-rein G pass from the bit $d$ back and under the suspension-strap D, and over the neck-strap E to hook and rings on the saddle, and are thereby held to their places without liability of entanglement, and yet have free play, so that they are always at the command of the driver.

Should the check-rein G unhook from the saddle, the straps D and E, by their connections on top of the animal's neck, would supply an additional check, beyond which the check-rein could not pass.

It will also be observed that, so long as the straps forming the safety-triangle remain intact, the horse cannot leave the thills, neither can the thills drop down.

Having thus described my invention, what I claim as new, and desire to secure by Letters Patent, is—

1. The strap D, combined with the cross-strap B, and forming therewith a safety-triangle, as and for the purposes described.

2. The combination and arrangement of the loops, rings, or eyes $a$, $a$, $b$, and $c$ with the straps B D, as and for the purposes described.

CLARENCE W. NICHOLS.

Witnesses:
P. E. KELLOGG,
H. H. FRARY.